United States Patent
Kim et al.

(10) Patent No.: US 10,461,288 B2
(45) Date of Patent: Oct. 29, 2019

(54) BATTERY MODULE AND BATTERY PACK INCLUDING SAME

(71) Applicant: LG CHEM, LTD., Seoul (KR)

(72) Inventors: Nam-In Kim, Daejeon (KR); Jae-Hyun Seo, Daejeon (KR); Young-Sop Eom, Daejeon (KR); Bo-Hyon Kim, Daejeon (KR); Hyun-Young Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/577,931

(22) PCT Filed: Sep. 8, 2016

(86) PCT No.: PCT/KR2016/010110
§ 371 (c)(1),
(2) Date: Nov. 29, 2017

(87) PCT Pub. No.: WO2017/082528
PCT Pub. Date: May 18, 2017

(65) Prior Publication Data
US 2018/0159096 A1    Jun. 7, 2018

(30) Foreign Application Priority Data
Nov. 10, 2015  (KR) .......................... 10-2015-0157572

(51) Int. Cl.
*H01M 2/20*    (2006.01)
*H01M 2/10*    (2006.01)
(Continued)

(52) U.S. Cl.
CPC ........... *H01M 2/1016* (2013.01); *B23K 26/21* (2015.10); *H01M 2/1077* (2013.01);
(Continued)

(58) Field of Classification Search
CPC .. H01M 2/1016; H01M 10/625; H01M 2/206; H01M 2/1077; H01M 10/482;
(Continued)

(56) References Cited

U.S. PATENT DOCUMENTS 9,472,797 B2    10/2016  Han et al.
2009/0142653 A1*  6/2009  Okada ................. H01M 2/1077
                                                          429/120
(Continued)

FOREIGN PATENT DOCUMENTS

EP            2 894 695 A2      8/2015
KR     10-2012-0132338 A       12/2012
(Continued)

OTHER PUBLICATIONS

International Search Report (PCT/ISA/210) issued in PCT/KR2016/010110, dated Dec. 20, 2016.

*Primary Examiner* — Cynthia K Walls
(74) *Attorney, Agent, or Firm* — Birch, Stewart, Kolasch & Birch, LLP

(57) ABSTRACT

The present disclosure relates to a battery module including a cartridge stack including a plurality of secondary batteries which each include an electrode lead and a plurality of cartridges which each accommodate at least one of the plurality of secondary batteries such that at least a portion of the electrode lead protrudes outwardly, and which are stacked in a plurality of stages, and an ICB housing which includes a stepped connection end, a power terminal installed fixedly to the connection end, and a bus bar electrically connecting the electrode lead with the power terminal, and which is mounted on a surface of the cartridge stack, in which the bus bar includes a first connection part which is provided in opposition to the power terminal, having the connection end therebetween, and is connected with the electrode lead, a second connection part which is
(Continued)

provided in opposition to the first connection part, having the connection end therebetween, and is connected with the power terminal, and a connection part which connects the first connection part with the second connection part and is embedded in the connection end.

15 Claims, 11 Drawing Sheets

(51) Int. Cl.
| | |
|---|---|
| *H01M 2/26* | (2006.01) |
| *H01M 2/30* | (2006.01) |
| *H01M 10/613* | (2014.01) |
| *H01M 10/625* | (2014.01) |
| *B23K 26/21* | (2014.01) |
| *H01M 10/0525* | (2010.01) |
| *H01M 10/48* | (2006.01) |
| *B23K 101/00* | (2006.01) |

(52) U.S. Cl.
CPC ........... *H01M 2/202* (2013.01); *H01M 2/206* (2013.01); *H01M 2/26* (2013.01); *H01M 2/30* (2013.01); *H01M 2/305* (2013.01); *H01M 10/0525* (2013.01); *H01M 10/482* (2013.01); *H01M 10/613* (2015.04); *H01M 10/625* (2015.04); *B23K 2101/006* (2018.08); *H01M 2220/20* (2013.01)

(58) Field of Classification Search
CPC .. H01M 10/0525; H01M 2/305; H01M 2/202; H01M 10/613; H01M 2/26; H01M 2/30; H01M 2220/20; B23K 26/21; B23K 2101/006
See application file for complete search history.

(56) References Cited

U.S. PATENT DOCUMENTS

| | | |
|---|---|---|
| 2012/0129041 A1 | 5/2012 | Komazawa |
| 2014/0111161 A1 | 4/2014 | Kim |
| 2016/0093862 A1* | 3/2016 | DeKeuster ............ H01M 2/206 429/121 |
| 2016/0233476 A1* | 8/2016 | Okamoto ............... H01G 11/76 |
| 2017/0125774 A1 | 5/2017 | Choi et al. |

FOREIGN PATENT DOCUMENTS

| | | | |
|---|---|---|---|
| KR | 10-2014-0052519 A | 5/2014 | |
| KR | 10-2014-0095660 A | 8/2014 | |
| KR | 10-1501026 B1 | 3/2015 | |
| KR | 10-2015-0052755 A | 5/2015 | |
| KR | 10-2015-0113827 A | 10/2015 | |
| WO | 2015037505 | * 3/2015 | ............. H01M 2/20 |

* cited by examiner

BATTERY MODULE AND BATTERY PACK INCLUDING SAME

TECHNICAL FIELD

The present disclosure relates to a battery module and a battery pack including the same.

The present application claims priority to Korean Patent Application No. 10-2015-0157572 filed on Nov. 10, 2015 in the Republic of Korea, the disclosure of which is incorporated herein by reference.

BACKGROUND ART

In these days, as the demand for portable electronic appliances such as laptop computers, video cameras, portable phones, etc., rapidly increases and the development of an electric vehicle, a storage battery for storing energy, a robot, a satellite, and the like hits its stride, active research has been conducted on high-performance secondary batteries capable of being repeatedly charged and discharged.

Secondary batteries commercially used at the present include nickel-cadmium batteries, nickel-hydrogen batteries, nickel-zinc batteries, lithium secondary batteries or the like, among which the lithium secondary batteries are in the limelight due to their very low self-discharge rate, high energy density, and free charging/discharging since a memory effect does not substantially occur in comparison to nickel-based secondary batteries.

Such a lithium secondary battery mainly uses lithium-based oxide and a carbon material as a cathode active material and an anode active material, respectively. The lithium secondary battery includes an electrode assembly, which includes a cathode plate coated with the cathode active material, an anode plate coated with the anode active material, and a separator disposed therebetween, and an outer casing, i.e., a battery case, to accommodate with a hermetic seal the electrode assembly therein along with an electrolyte solution.

Generally, lithium secondary batteries may be classified, depending on a shape of a battery casing, into can shaped secondary batteries in which an electrode assembly is embedded in a metal casing and pouch-type secondary batteries in which an electrode assembly is embedded in a pouch of an aluminum laminate sheet.

Recently, secondary batteries have been widely used for medium and large devices such as vehicles or power storage devices as well as small devices such as portable electronic devices. For use in medium and large devices, a number of secondary batteries are electrically connected to increase capacity and output. Especially for medium and large devices, a pouch-type secondary battery is mostly used due to its easy accommodation and stacking.

A battery module may mean an element in which a plurality of secondary batteries are connected in series or parallel to increase capacity, output, etc. The battery module is electrically connected with external electronic devices by a power terminal. To this end, a conventional battery module includes a cartridge stack in which secondary batteries are accommodated, an interconnect board ("ICB") housing including a first bus bar connected with an electrode lead of the secondary batteries, and a module case including a second bus bar connected with the first bus bar and a power terminal connected with the second bus bar.

Meanwhile, the first bus bar of the ICB housing is connected with the electrode lead of the secondary batteries and the second bus bar of the module case through laser welding. To this end, laser welding processing including two processes of a first welding process of laser-welding the electrode lead of the secondary batteries with the first bus bar after installation of the ICB housing and a second welding process of laser-welding the first bus bar with the second bus bar after installation of the module case. Thus, the conventional battery module has a complex electric connection structure between the secondary batteries and the power terminal, requiring much time in assembling the battery module.

DISCLOSURE

Technical Problem

The present disclosure is designed to solve the problems of the related art, and therefore the present disclosure is directed to providing a battery module having an improved structure for simplifying an electric connection structure between secondary batteries and a power terminal, and a battery pack including the battery module.

Technical Solution

In one aspect of the present disclosure, there is provided a battery module including a cartridge stack including a plurality of secondary batteries which each include an electrode lead and a plurality of cartridges which each include accommodate at least one of the plurality of secondary batteries such that at least a portion of the electrode lead protrudes outwardly, and which are stacked in a plurality of stages, and an ICB housing which includes a stepped connection end, a power terminal installed fixedly to the connection end, and a bus bar electrically connecting the electrode lead with the power terminal, and which is mounted on a surface of the cartridge stack, in which the bus bar includes a first connection part which is provided in opposition to the power terminal, having the connection end therebetween, and is connected with the electrode lead, a second connection part which is provided in opposition to the first connection part, having the connection end therebetween, and is connected with the power terminal, and a connection part which connects the first connection part with the second connection part and is embedded in the connection end.

Preferably, the ICB housing may be molded by inserting the bus bar thereinto such that the connection part is embedded in the connection end.

Preferably, the ICB housing may further include a lead hole bored to allow an end portion of the electrode lead to pass therethrough, and the first connection part may be connected with the end portion of the electrode lead passing through the lead hole.

Preferably, the electrode lead may include a bent portion formed by bending the end portion passing through the lead hole at a preset angle such that the end portion is connected with the first connection part at a preset connection point.

Preferably, the electrode lead and the first connection part may be connected at the connection point by laser-welding.

Preferably, the power terminal may include a fixed part embedded in the connection end and a terminal part extending from the fixed part to protrude outwardly from the connection end, and the second connection part may be connected with the terminal part.

Preferably, the second connection part may include a connection hole which is bored to allow the terminal part to pass therethrough and is connected with the terminal part.

Preferably, the ICB housing may be molded by inserting the power terminal thereinto such that the fixed part is embedded in the connection end.

Preferably, the battery module may further include an ICB cover mounted on an outer surface of the ICB housing to cover the first connection part and the electrode lead.

Preferably, the battery module may further include a cooling plate mounted on another surface of the cartridge stack to receive heat generated in the plurality of secondary batteries through the plurality of cartridges and to radiate the heat to outside.

Preferably, the ICB cover may be integrally coupled with the cooling plate such that the ICB cover is mounted on the outer surface of the ICB housing when the cooling plate is mounted on the another surface of the cartridge stack, thus forming a cooling plate assembly.

Preferably, the ICB cover may be provided to selectively cover a space between the cooling plate and the connection end such that the second connection part and the power terminal are exposed to an outside.

In another aspect of the present disclosure, there is provided a battery pack including the battery module according to the above-described aspect of the present disclosure.

In another aspect of the present disclosure, there is provided a vehicle including the battery pack according to the above-described aspect of the present disclosure.

Advantageous Effects

The battery module according to the present disclosure has effects as described below.

First, the present disclosure reduces the number of times of laser welding required for electric connection between a power terminal and secondary batteries, saving a time required for assembling the battery module.

Second, the present disclosure reduces the number of bus bars required for electric connection between a power terminal and secondary batteries, simplifying a structure of the battery module.

BEST MODE

Figure 1:
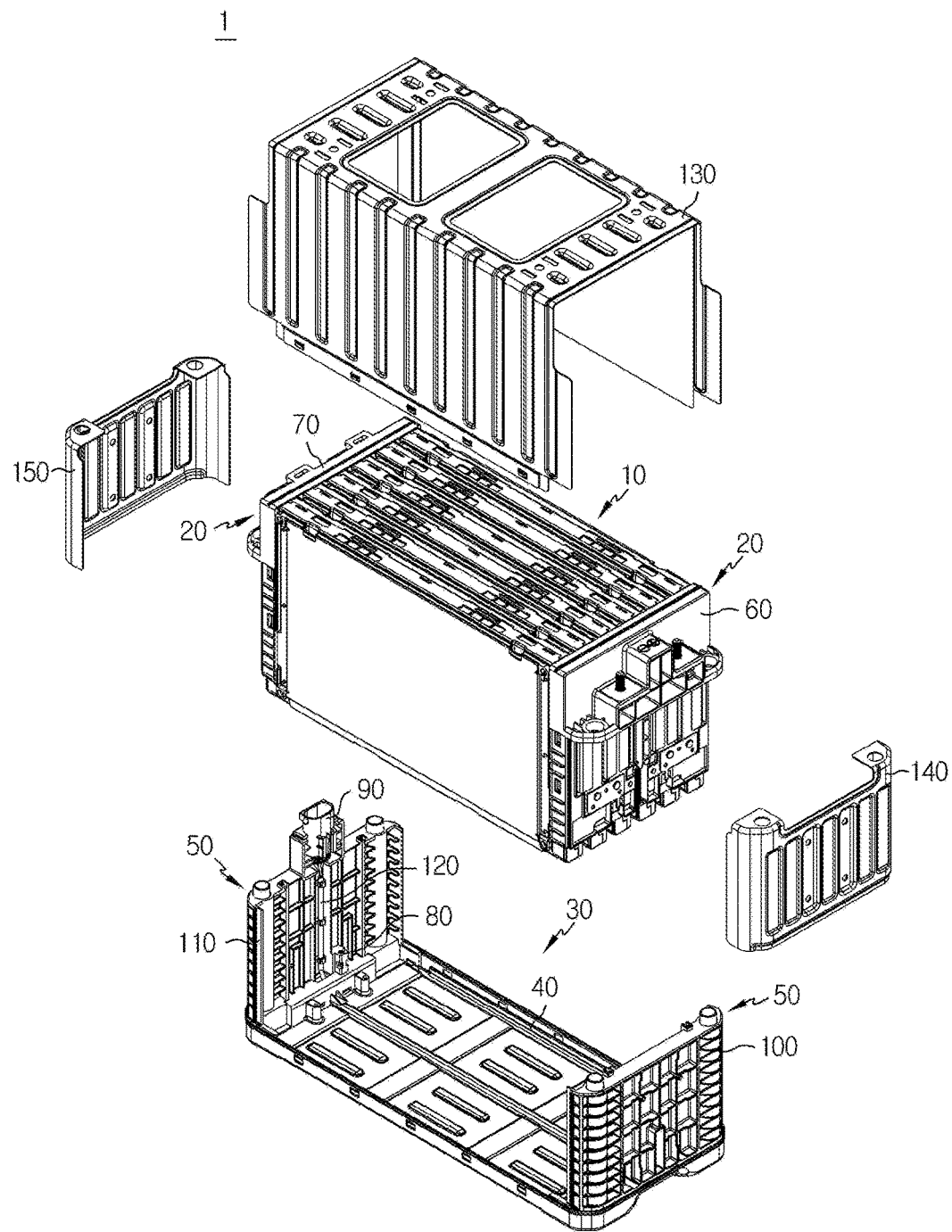
FIG. 1 is an exploded perspective view of a battery module according to an embodiment of the present disclosure.

The terms or words used in the description and claims below should not be interpreted as only general or dictionary meanings, but interpreted as meanings and concepts satisfying the present disclosure based on a principle in that the inventor can appropriately define his/her disclosure with a concept of the terms in order to describe the disclosure in the best method. Therefore, since embodiments described in the present specification and configurations shown in the drawings are merely exemplary embodiments of the present disclosure and do not represent all of the present disclosure, it should be understood that there may be various equivalents and modified examples that can replace the embodiments described in the present specification and the configurations shown in the drawings at the time of filling the present application.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

FIG. 1 is an exploded perspective view of a battery module according to an embodiment of the present disclosure.

Referring to FIG. 1, a battery module 1 may include a cartridge stack 10 which includes a plurality of secondary batteries 12, each including an electrode lead 16, and a plurality of cartridges 14 which each accommodate the secondary battery 12 in such a way that at least a portion of the electrode lead 16 protrudes outwardly, and which are stacked in a plurality of stages, an ICB housing 20 which includes a power terminal 63 connected with external electric devices and a bus bar 67 electrically connecting the electrode lead 16 with the power terminal 63; and a cooling plate assembly 30 which includes a cooling plate 40 radiating heat generated in the secondary batteries 12 to the outside and an ICB cover 50 covering a connection point P between the electrode lead 16 and the bus bar 67. A plurality of battery modules 1 may be connected in a preset electric connection manner to form a battery pack. Such a battery pack may be installed in a vehicle for use.

Figure 2:
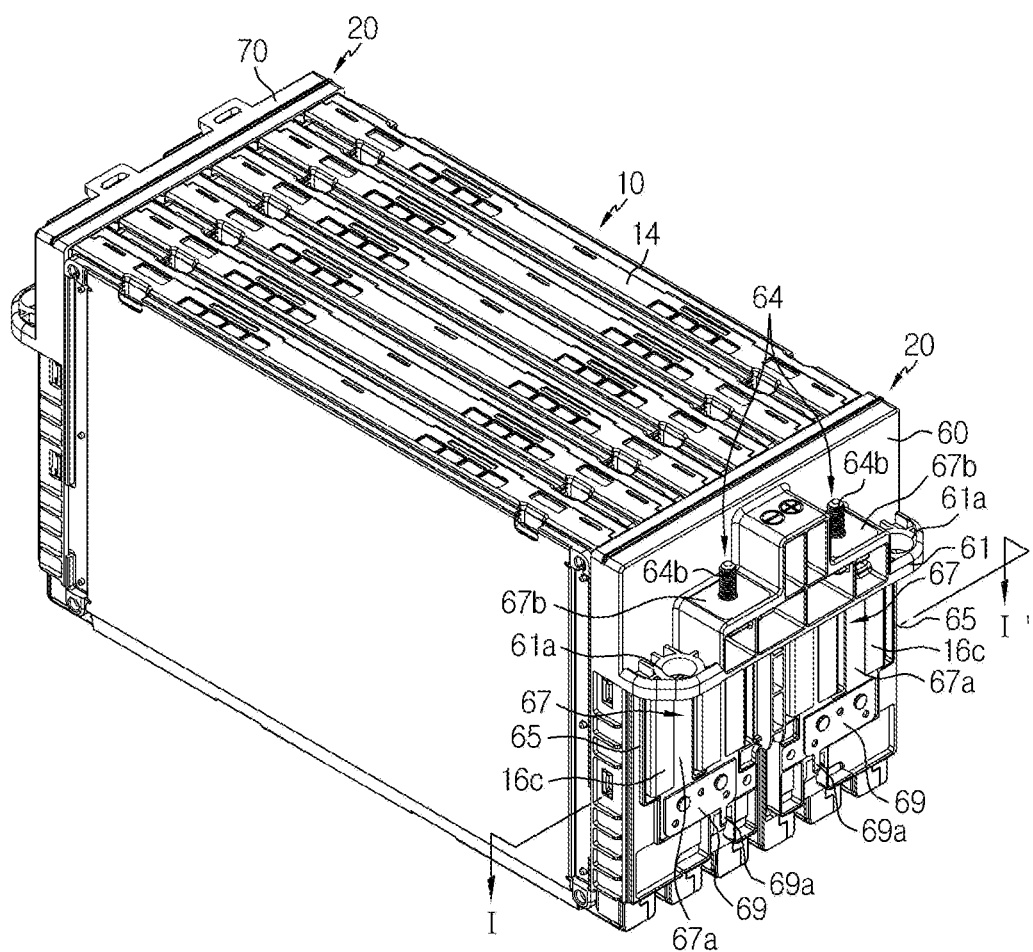
FIG. 2 is an assembled perspective view for describing a cartridge stack and an ICB housing, shown in FIG. 1.
Figure 3:
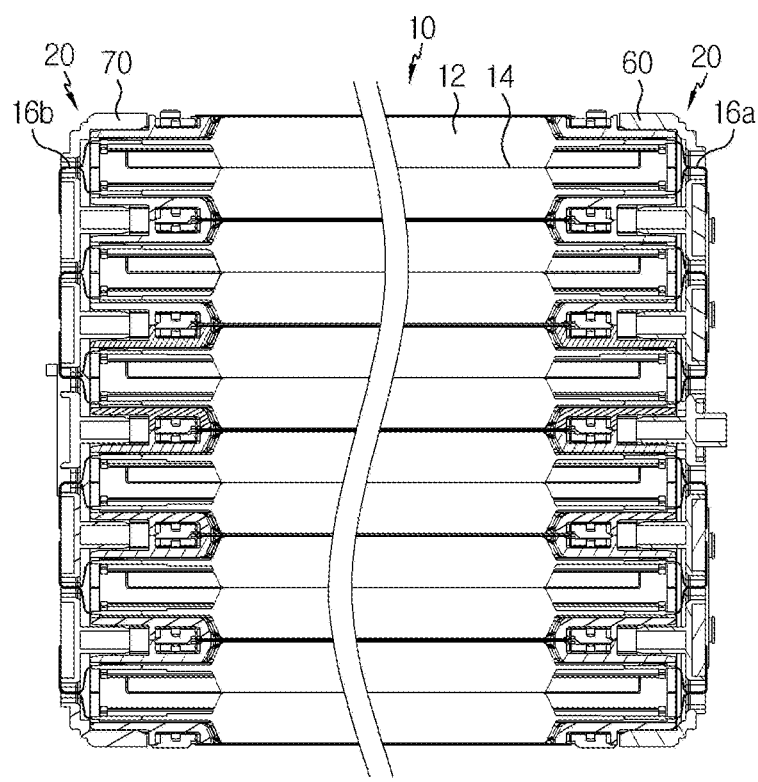
FIG. 3 is a cross-sectional view of a cartridge stack and an ICB housing of FIG. 3, taken along a line I-I'.
Figure 4:
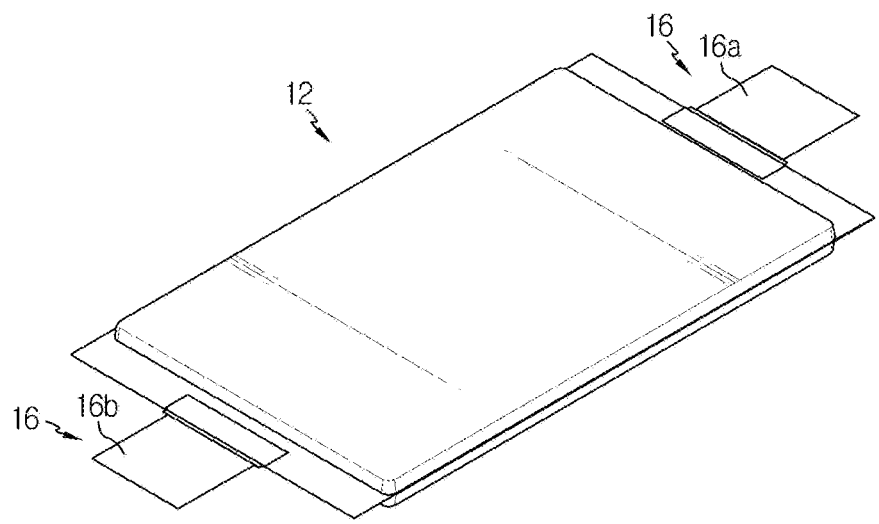
FIG. 4 is a perspective view showing a schematic structure of a secondary battery shown in FIG. 3.

FIG. 2 is an assembled perspective view for describing a cartridge stack and an ICB housing, shown in FIG. 1, FIG. 3 is a cross-sectional view of a cartridge stack and an ICB housing of FIG. 3, taken along line I-I', and FIG. 4 is a perspective view showing a schematic structure of a secondary battery shown in FIG. 3.

First, the cartridge stack 10 is a member for accommodating the plurality of secondary batteries 12.

The cartridge stack 10 may include the plurality of secondary batteries 12 and the plurality of cartridges 14 that accommodate at least one of the plurality of secondary batteries 12, respectively, as shown in FIGS. 2 and 3.

The secondary batteries 12 may include lithium polymer batteries. However, materials of the secondary batteries 12 are not limited to this example, and the secondary materials 12 may include lithium-ion batteries, nickel-cadmium batteries, nickel hydrogen batteries, nickel zinc batteries, and so forth.

The secondary batteries 12 may be of a pouch type as shown in FIG. 4. However, a type of the secondary batteries 12 is not limited to this example, and the secondary materials 12 may be of a cylindrical type, a square type, and so forth.

As shown in FIG. 4, the secondary battery 12 is provided with a pair of electrode leads 16 including a first electrode lead 16a that is provided at an end of the secondary battery 12 and has any one of a positive pole and a negative pole and a second electrode lead 16b that is provided at the other end of the secondary battery 12 and has the other one of the positive pole and the negative pole.

As shown in FIG. 3, each of the cartridges 14 accommodates and holds the secondary battery 12 such that at least a portion of the first electrode lead 16a and at least a portion of the second electrode lead 16b protrude outwardly, thereby preventing movement of the secondary battery 12.

The cartridges 14 are stacked onto one another to facilitate stacking and assembling of the secondary batteries 12 as shown in FIG. 3. Thus, as shown in FIG. 3, the cartridges 14 are stacked in a plurality of stages, thus forming the cartridge assembly 10.

Figure 5:
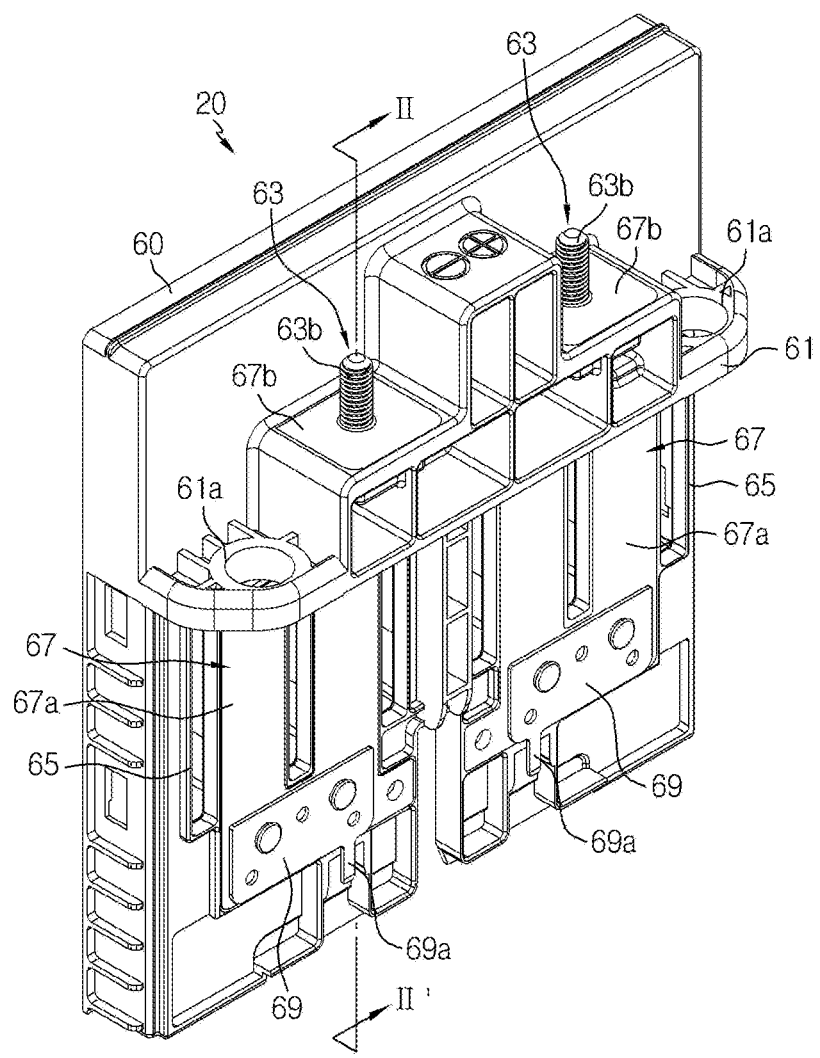
FIG. 5 is a perspective view of a first ICB housing shown in FIG. 2.
Figure 6:
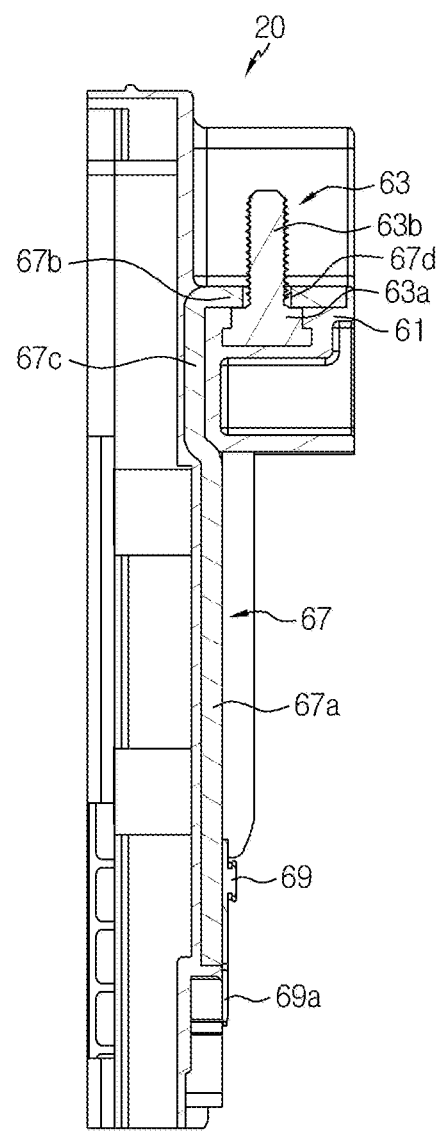
FIG. 6 is a cross-sectional view of a first ICB housing of FIG. 5, taken along line II-II'.
Figure 7:
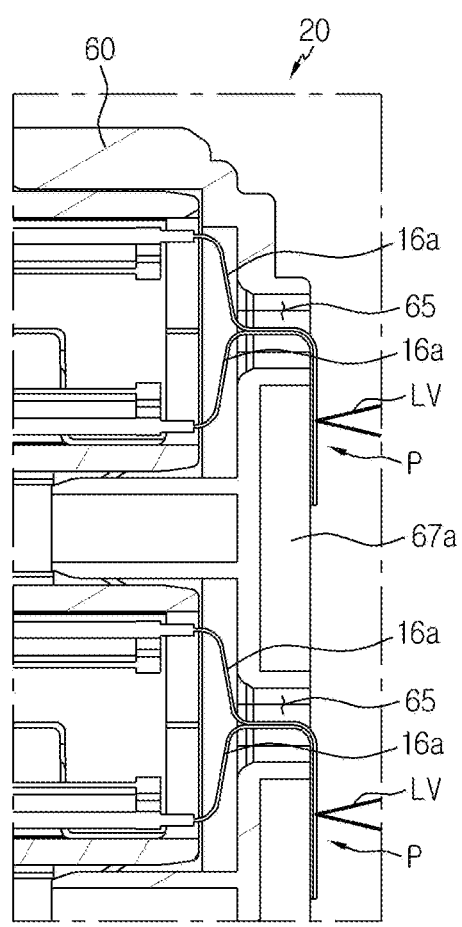
FIG. 7 is an enlarged view of a region A of FIG. 3.

FIG. 5 is a perspective view of a first ICB housing shown in FIG. 2, FIG. 6 is a cross-sectional view of a first ICB housing of FIG. 5, taken along line II-II', and FIG. 7 is an enlarged view of a region A of FIG. 3.

Next, the ICB housing 20 is a member for electrically connecting the secondary batteries 12.

As shown in FIG. 3, the ICB housing 20 may include a first ICB housing 60 coupled to a front surface of the cartridge stack 10 to electrically connect the first electrode leads 16a of the secondary batteries 12 and a second ICB housing 70 coupled to a back surface of the cartridge stack 10 to electrically connect the second electrode leads 16b of the secondary batteries 12.

The first ICB housing 60 and the second ICB housing 70 are connected with the electrode leads 16 of the secondary batteries 12 to connect the secondary batteries 12 in series or in parallel. The first ICB housing 60 and the second ICB housing 70 have a main difference depending on whether they include the power terminal 63. Hereinbelow, for convenience of a description, a structure of the ICB housing 20 will be described, taking the first ICB housing 60 including the power terminal 63 as an example.

As shown in FIG. 5, the first ICB housing 60 may include a stepped connection end 61, the power terminal 63 installed fixedly to the connection end 61, a lead hole 65 bored to allow the first electrode lead 16a to pass therethrough, the bus bar 67 electrically connecting the first electrode lead 16a passing through the lead hole 65 with the power terminal 63, and a connection tab 69 electrically connecting the bus bar 67 with an external measurement circuit.

The connection end 61 protrudes in a stepwise manner from the front surface of the first ICB housing 60 in such a way to be positioned above the lead hole 65, as shown in FIG. 5. The connection end 61 includes at least one fitting hole 61a bored to fit-couple a fixing bush 102 of a first ICB cover 100, which is to be described below, thereto. The connection end 61 may isolate the power terminal 63 and the second connection part 67b of the bus bar 67 from the first connection part 67a of the bus bar 67 and the first electrode lead 16a.

The power terminal 63 is fixedly installed on a top surface of the connection end 61 and is provided as a pair having opposite polarities, as shown in FIG. 5. The power terminal 63 may include a fixed part 63a fixedly embedded in the connection end 61 and a terminal part 63b extending from the fixed part 63a to protrude outwardly from the connection end 61, as shown in FIG. 6.

The fixed part 63a is embedded in an upper portion of the connection end 61 to fix the power terminal 63 to the top surface of the connection end 61, as shown in FIG. 6.

The fixed part 63a may have a larger diameter than that of the terminal part 63b, but the present disclosure is not limited thereto.

The terminal part 63b extends from the fixed part 63a to protrude outwardly from the connection end 61 through the top surface of the connection end 61, as shown in FIG. 6. The terminal part 63b may have a screw thread on an outer circumferential surface thereof, but the present disclosure is not limited thereto. The terminal part 63b is connected with a second connection part 67b and an external electric device, thereby electrically connecting the secondary batteries 12 with the external electric device.

A plurality of lead holes 65 are bored with preset spaces therebetween to allow the first electrode leads 16a of the secondary batteries 12 to pass therethrough, respectively, as shown in FIG. 5.

As shown in FIG. 6, the bus bar 67 may include a first connection part 67a which is provided in opposition to the power terminal 63 with the connection end 61 therebetween and is connected with the first electrode leads 16a of the secondary batteries 12, the second connection part 67b which is provided in opposition to the first connection part 67a with the connection end 61 therebetween and is connected with the power terminal 63, and a connection part 67c which connects the first connection part 67a with the second connection part 67b and is fixedly embedded in the connection end 61.

As shown in FIGS. 5 and 6, the first connection part 67a extends from a lower end portion of the connection part 67c toward the lead holes 65 and is mounted on the front surface of the first ICB housing 60. The first connection part 67a may pass through the space between the lead holes 65, but the present disclosure is not limited to this example.

The first connection part 67a is connected with an end portion of the first electrode lead 16a passing through the lead holes 65 at a preset connection point P. To this end, the first electrode lead 16a may include a bent portion 16c formed by bending an end portion protruding outwardly from the first ICB housing 60 through the lead hole 65 at a preset angle such that the end portion is connected with the first connection part 67a at the connection point P, as shown in FIG. 7.

The first connection part 67a and the bent portion 16c may be connected by being welded by laser LV at the connection point P, as shown in FIG. 7. However, the present disclosure is not limited to this example, and the first connection part 67a and the bent portion 16c may be connected at the connection point P by various welding methods such as ultrasonic welding as well as laser welding.

As shown in FIG. 6, the second connection part 67b extends in a bent manner from an upper end portion of the connection part 67c toward the terminal part 63b and is mounted on the top surface of the connection end 61. As shown in FIG. 6, the second connection part 67b may include a connection hole 67d bored to allow the terminal part 63b to pass therethrough. The second connection part 67b is connected with the terminal part 63b by contact between an inner circumferential surface of the connection hole 67d and an outer circumferential surface of the terminal part 63b.

As shown in FIG. 6, the connection part 67c is provided between the first connection part 67a and the second connection part 67b to connect the first connection part 67a with the second connection part 67b, and is fixedly embedded in the connection end 61. The connection part 67c perpendicularly passes through the connection end 61 to isolate the first connection part 67a and the second connection part 67b from each other in such a way that the first connection part 67a is positioned below the connection end 61 and the second connection part 67b is positioned above the connection end 61.

As shown in FIG. 5, the connection tab 69 is coupled and connected to a lower end portion of the first connection part 67a extending below the lead holes 65. The number of formed connection tabs 69 is not specifically limited, and at least one connection tab 69 may be provided depending on a method of electrically connecting the secondary batteries 12.

As shown in FIG. 5, the connection tab 69 may include a connection pin 69a protruding in a downward direction of the first ICB housing 60, that is, toward the cooling plate 40 to be described later. The connection pin 69a is coupled and connected with a receptacle 80 of the cooling plate assembly 30 to be described below when the cooling plate 40 is coupled to a bottom surface of the cartridge stack 10, such that the connection pin 69a is electrically connected with an external measurement circuit of the secondary batteries 12 via the receptacle 80.

Meanwhile, due to a limitation in a structure where a portion of the power terminal 63 and a portion of the bus bar 67, that is, the fixed part 63a and the connection part 67c are embedded in the connection end 61, there may be a difficulty in installing the power terminal 63 and the bus bar 67 on the first ICB housing 60 that has been already molded. To solve this problem, the first ICB housing 60 may be molded by inserting the power terminal 63 and the bus bar 67 thereinto such that the fixed part 63a and the connection part 67c are embedded in the above-described preset positions of the connection end 61.

Figure 8:
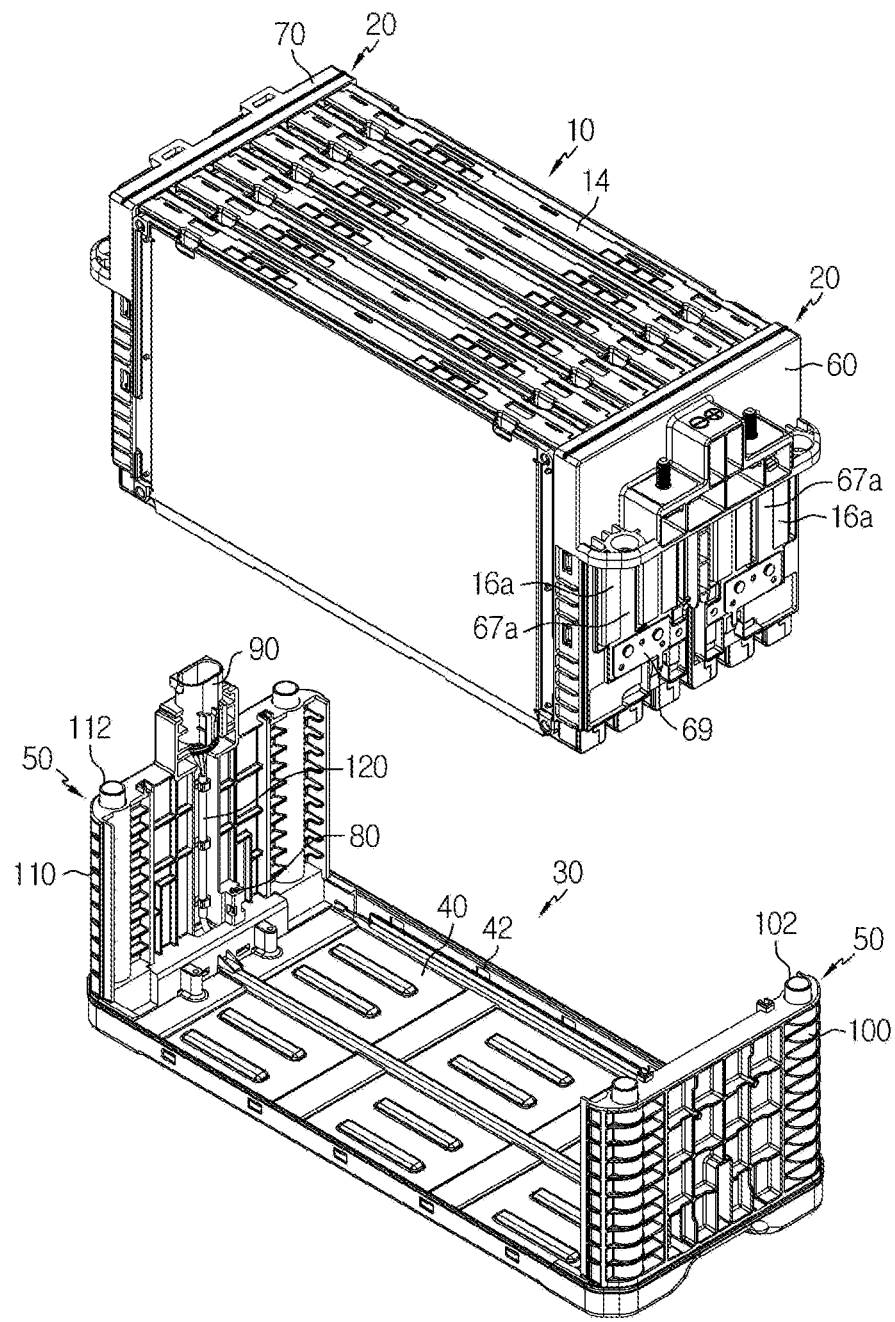
FIG. 8 is an exploded perspective view for describing a cooling plate assembly shown in FIG. 1.
Figure 9:
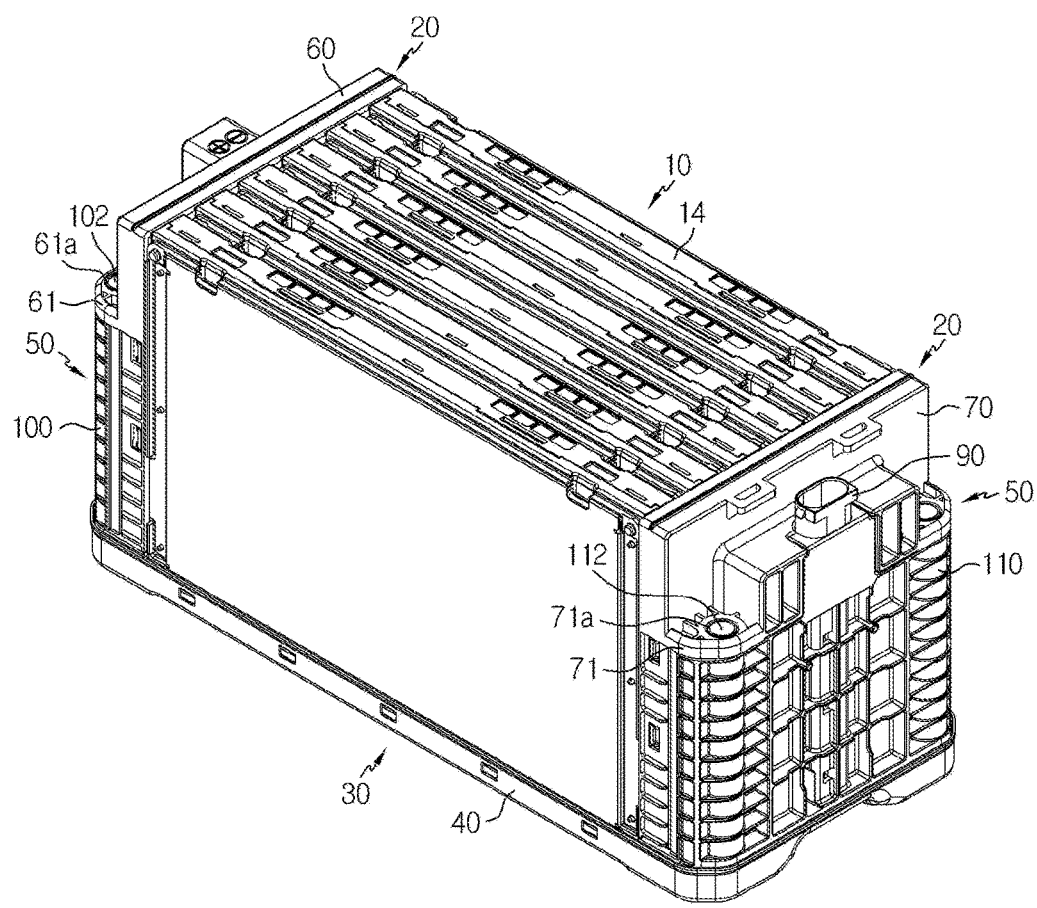
FIG. 9 is an assembled perspective view for describing a cooling plate assembly shown in FIG. 1.

FIG. 8 is an exploded perspective view for describing a cooling plate assembly shown in FIG. 1, and FIG. 9 is an assembled perspective view for describing a cooling plate assembly shown in FIG. 1.

Next, the cooling plate assembly 30 is a member for cooling the secondary batteries 12 and protecting the connection point P between the bus bar 67 and the connection lead 16 from the outside.

As shown in FIG. 8, the cooling plate assembly 30 may include the cooling plate 40 mounted on the bottom surface of the cartridge stack 10 to contact the cartridges 14, the ICB cover 50 mounted on the front surface of the ICB housing 20 to insulate the first connection part 67a of the bus bar 67 from the bent portion 16c of the electrode lead 16, the receptacle 80 coupled and connected with the connection pin 69a of the connection tab 69, and a sensing connector 90 coupled and connected with a circuit connector (not shown) included in an external measurement circuit.

As shown in FIG. 8, the cooling plate 40 has a shape corresponding to the bottom surface of the cartridge stack 10 to contact the cartridges 14. As shown in FIG. 8, the cooling plate 40 is formed with a preset space at a side thereof, and may include a hook hole 42 to which an elastic hook 132 of a top end plate to be described below is lockingly coupled.

As shown in FIG. 8, the ICB cover 50 may include the first ICB cover 100 mounted on the front surface of the first ICB housing 60 and the second ICB cover 110 mounted on a front surface of the second ICB housing 70. The first ICB cover 100 has a shape corresponding to the front surface of the first ICB housing 60, and when the cooling plate 40 is coupled to the bottom surface of the cartridge stack 10, the first ICB cover 100 is coupled to an end portion of a side of the cooling plate 40 in such a way to be mounted on the front surface of the first ICB housing 60. The second ICB cover 110 has a shape corresponding to the front surface of the second ICB housing 70, and when the cooling plate 40 is coupled to the bottom surface of the cartridge stack 10, the second ICB cover 110 is coupled to an end portion of another side of the cooling plate 40 in such a way to be mounted on the front surface of the second ICB housing 70.

As shown in FIG. 9, the ICB cover 50 is provided to selectively cover the space between the cooling plate 40 and the connection end 61 of the ICB housing 20 such that the second connection part 67b of the bus bar 67 and the terminal part 63b of the power terminal 63 are exposed to the outside. The ICB cover 50 may include fixing bushes 102 and 112 fit-coupled to the fitting hole 61a of the ICB housing 20 to couple the ICB cover 50 with the ICB housing 20. On inner circumferential surfaces of the fixing bushes 102 and 102, a screw thread capable of being screw-coupled with a bolt may be formed, but the present disclosure is not limited to this example.

As shown in FIG. 8, the receptacle 80 is provided on an inner surface of the ICB cover 50 such that when the cooling plate 40 is coupled to the bottom surface of the cartridge stack 10, the receptacle 80 is coupled and connected with the connection pin 69a of the connection tab 69. The number of installed receptacles 80 is not specially limited, and as many receptacles 80 as the connection tabs 69 are installed to be coupled and connected with the connection pins 69a of the connection tabs 69, respectively.

As shown in FIG. 8, the sensing connector 90 is fixedly installed on the ICB cover 50, more specifically, on an upper end portion of the second ICB cover 110, and is provided in such a way to be engaged and connected with a circuit connector included in an external measurement circuit. The sensing connector 90 is electrically connected with the receptacles 80 by sensing wires 120. Thus, the external measurement circuit is electrically connected with the secondary batteries 12 through the sensing connector 90 to measure voltage of the secondary batteries 12.

Such an assembly of the cooling plate 40 is installed such that the cooling plate 40 is mounted on the bottom surface of the cartridge stack 10 and the ICB cover 50 is mounted on the front surface of the ICB housing 20, as shown in FIG. 9. The cooling plate 40 then contacts the cartridges 14, receives heat generated in the secondary batteries 12 through the cartridges 14, and radiates the received heat to the outside, thereby cooling the secondary batteries 12. The ICB cover 50 may cover and insulate the first connection part 67a of the bus bar 67 and the electrode lead 16 of the secondary battery 12 to protect them from the outside.

Figure 10:
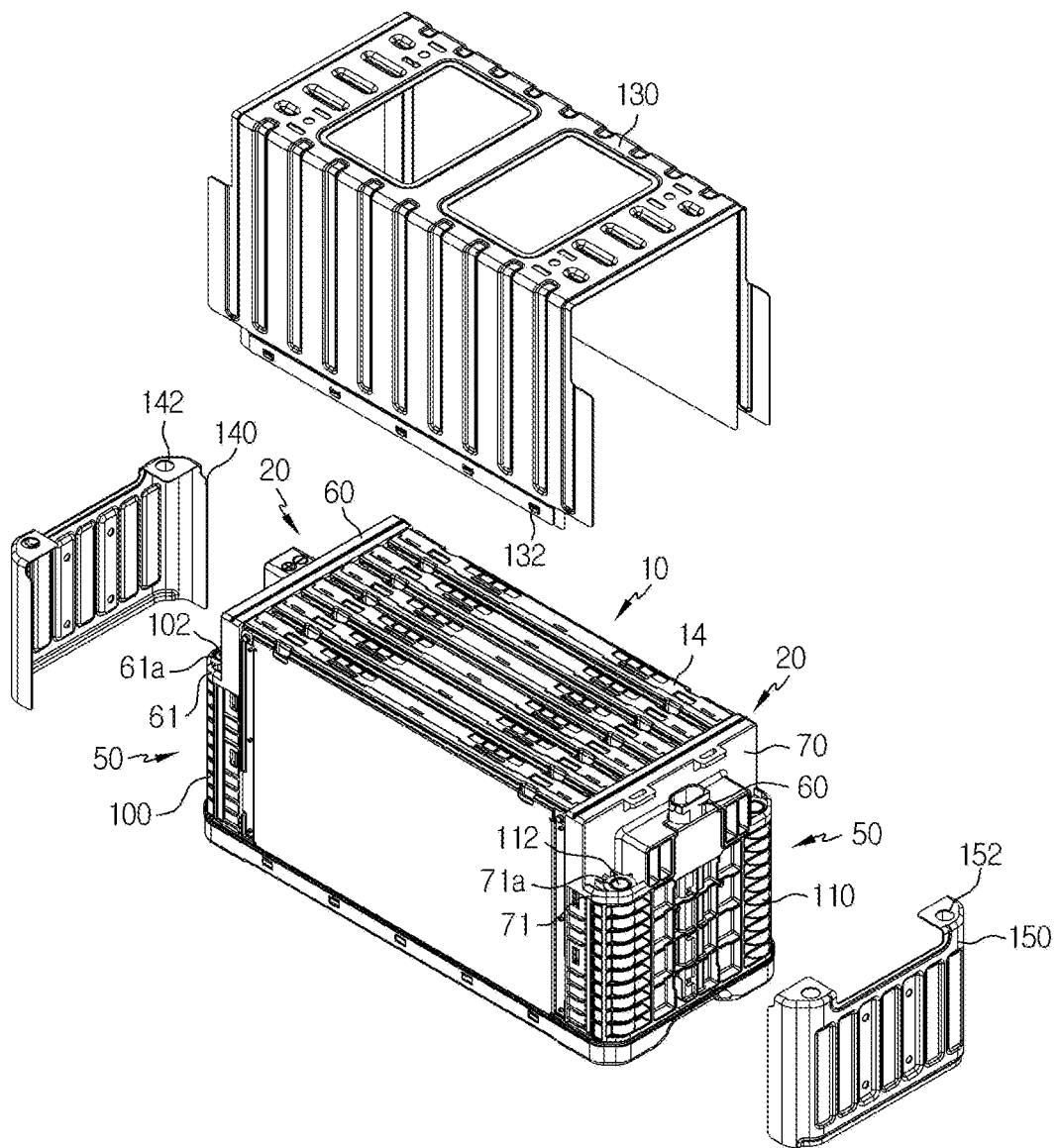
FIG. 10 is an exploded perspective view for describing an end plate assembly shown in FIG. 1.
Figure 11:
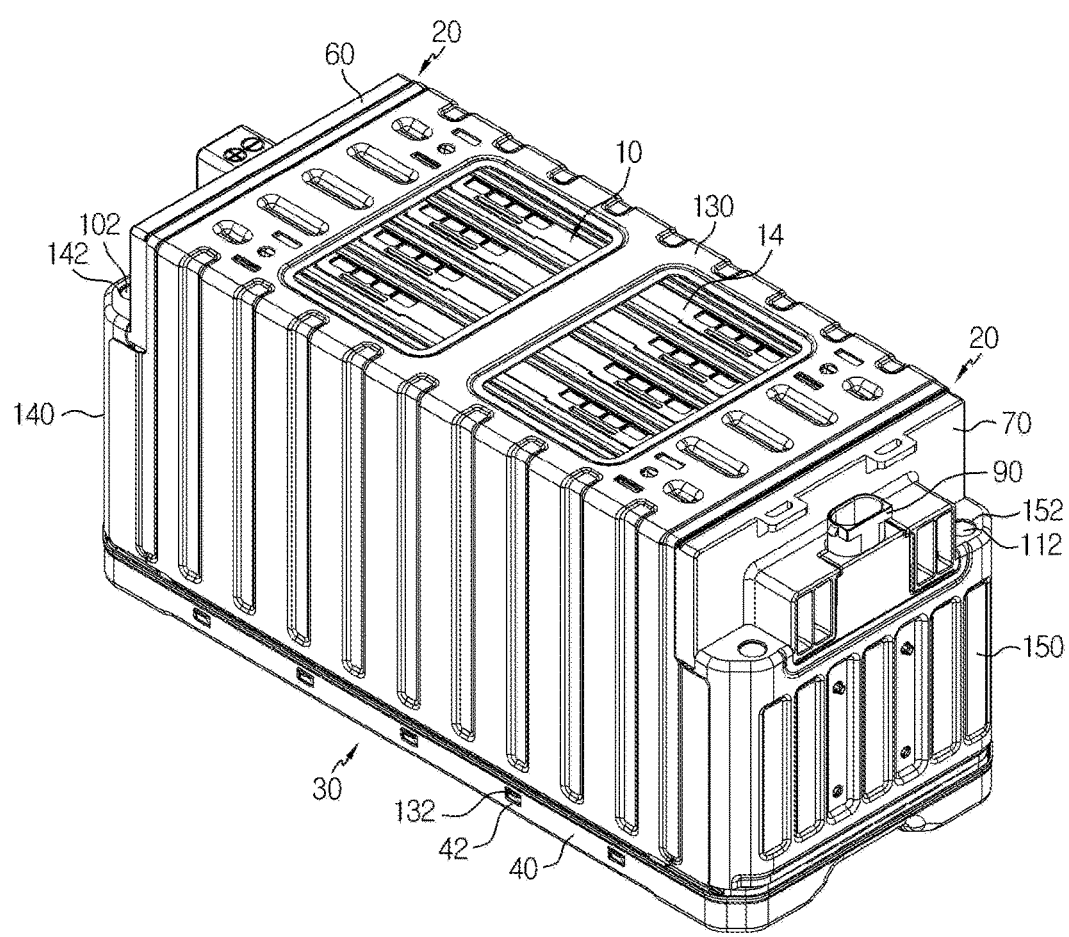
FIG. 11 is an assembled perspective view for describing an end plate assembly shown in FIG. 1.

FIG. 10 is an exploded perspective view for describing an end plate assembly shown in FIG. 1, and FIG. 11 is an assembled perspective view for describing an end plate assembly shown in FIG. 1.

The battery module 1 may further include end plates that protect the above-described members from the outside. For example, the battery module 1 may include a first end plate 130 that protects the cartridge stack 10 from the outside, a second end plate 140 that protects the first ICB cover 100, and a third end plate 150 that protects the second ICB cover 110.

As shown in FIGS. 10 and 11, the first end plate 130 has a shape of and is mounted on the exterior of the cartridge stack 10 to cover the top surface and both side surfaces of the cartridge stack 10. The first end plate 130 may include a plurality of elastic hooks 132 which are formed with a preset space therebetween and each are lockingly coupled to any one of the hook holes 42 of the cooling plate 40 to couple the first end plate 130 with the cooling plate 40.

As shown in FIGS. 10 and 11, the second end plate 140 has a curved shape whose opposite side end portions are round, and is mounted on the exterior of the first ICB housing 60 and the first ICB cover 100 to selectively expose the second connection part 67b of the bus bar 67 and the terminal part 63b of the power terminal 63 to the outside. The second end plate 140 may include a communication hole 142 bored to communicate with the fixing bush 102 of the first ICB cover 100. Thus, a bolt is screw-coupled to the fixing bush 102 of the first ICB cover 100 through the communication hole 142 to couple the second end plate 140 with the first ICB cover 100.

As shown in FIGS. 10 and 11, the third end plate 150 has a curved shape whose opposite side end portions are round, and is mounted on the exterior of the second ICB housing 70 and the second ICB cover 110 to selectively expose the sensing connector 90 to the outside. The third end plate 150 may include a communication hole 152 bored to communicate with the fixing bush 112 of the second ICB cover 110. Thus, a bolt is screw-coupled to the fixing bush 112 of the second ICB cover 110 through the communication hole 152 to couple the third end plate 150 with the second ICB cover 110.

In a conventional battery module, a first bus bar for electrically connecting electrode leads of secondary batteries is provided on an ICB housing, and a power terminal connected with an external electric device and a second bus bar for electrically connecting the power terminal with the first bus bar of the ICB housing are provided on a module case. As a result, in the conventional battery module, to electrically connect the electrode leads of the secondary batteries with the power terminal, two welding processes are required, which include a first welding process of laser-welding the electrode leads of the secondary batteries with the first bus bar of the ICB housing and a second welding process of laser-welding the first bus bar of the ICB housing with the second bus bar of the module case.

On the other hand, in the battery module 1, as described above, the power terminal 63 connected with an external electric device and the bus bar 67 for electrically connecting the electrode leads 16 of the secondary batteries 12 with the power terminal 63 directly are provided together on the ICB housing 20. Therefore, in the battery module 1, the bus bar 67 and the electrode leads 16 of the secondary batteries 12 may be electrically connected through a single welding process of laser-welding them. Hence, the battery module 1 reduces the number of times of laser welding required for electric connection of the power terminal 63, saving a time required for assembling the battery module 1. Moreover, in the battery module 1, the electrode leads 16 of the secondary batteries 12 and the power terminal 63 may be directly connected using one bus bar 67, thereby reducing the number of bus bars needed for electric connection of the power terminal 63 and thus simplifying a structure of the battery module 1, when compared to a conventional battery module.

Although the present disclosure has been described with reference to limited embodiments and drawings, the present disclosure is not limited thereto, and it would be obvious that various modifications and changes may be made by those of ordinary skill in the art without departing from the present disclosure and a scope equivalent to the appended claims.

INDUSTRIAL APPLICABILITY

The present disclosure relates to a battery module and a battery pack including the same, and is applicable particularly to the industry associated with secondary batteries.

What is claimed is:

1. A battery module comprising:
    a cartridge stack comprising a plurality of secondary batteries which each comprise an electrode lead, and a plurality of cartridges which each accommodate at least one of the plurality of secondary batteries such that at least a portion of each electrode lead of each secondary battery protrudes outwardly, and which are stacked in a plurality of stages; and
    an interconnect board ("ICB") housing comprising a stepped connection end, a power terminal installed fixedly to the stepped connection end, and a bus bar electrically connecting each electrode lead with the power terminal, and mounted on a surface of the cartridge stack,
    wherein the bus bar comprises a first connection part which is provided in opposition to the power terminal, having the stepped connection end therebetween, and is connected with each electrode lead, a second connection part which is provided in opposition to the first connection part, having the stepped connection end therebetween, and is connected with the power terminal, and a connection part which connects the first connection part with the second connection part and is embedded in the stepped connection end such that the connection part is hidden by the stepped connection end.

2. The battery module of claim 1, wherein the ICB housing is injection-molded by inserting the bus bar thereinto such that the connection part is embedded in the stepped connection end.

3. The battery module of claim 1, wherein the ICB housing further comprises a lead hole bored to allow an end portion of each electrode lead to pass therethrough, and
    the first connection part is connected with the end portion of each electrode lead passing through the lead hole.

4. The battery module of claim 3, wherein each electrode lead comprises a bent portion formed by bending the end portion passing through the lead hole at a preset angle such that the end portion is connected with the first connection part at a preset connection point.

5. The battery module of claim 4, wherein each electrode lead and the first connection part are connected at the connection point by laser-welding.

6. The battery module of claim 1, wherein the power terminal comprises a fixed part embedded in the stepped connection end and a terminal part extending from the fixed part to protrude outwardly from the stepped connection end, and
    the second connection part is connected with the terminal part.

7. The battery module of claim 6, wherein the second connection part comprises a connection hole which is bored to allow the terminal part to pass therethrough and is connected with the terminal part.

8. The battery module of claim 6, wherein the ICB housing is injection-molded by inserting the power terminal thereinto such that the fixed part is embedded in the stepped connection end.

9. The battery module of claim 1, further comprising an ICB cover mounted on an outer surface of the ICB housing to cover the first connection part and the each electrode lead.

10. The battery module of claim 9, further comprising a cooling plate mounted on another surface of the cartridge stack and receiving heat generated from the plurality of secondary batteries through the plurality of cartridges and radiating the heat to outside.

11. The battery module of claim 10, wherein the ICB cover is integrally coupled with the cooling plate such that the ICB cover is mounted on the outer surface of the ICB housing when the cooling plate is mounted on the another surface of the cartridge stack, thus forming a cooling plate assembly.

12. The battery module of claim 11, wherein the ICB cover is provided to selectively cover a space between the cooling plate and the stepped connection end such that the second connection part and the power terminal are exposed to outside.

13. A battery pack comprising the battery module according to claim 1.

14. A vehicle comprising the battery pack according to claim 13.

15. The battery module of claim 1, wherein the second connection part extends normal to ICB housing, and
wherein the power terminal extends normal to the second connection part.

\* \* \* \* \*